(12) United States Patent
Cheng et al.

(10) Patent No.: US 8,084,986 B2
(45) Date of Patent: Dec. 27, 2011

(54) DEAD-TIME COMPENSATION APPARATUS OF PWM INVERTER AND METHOD THEREOF

(75) Inventors: Lung-Jay Cheng, Taipei (TW); Ting-Chung Hsieh, Taipei (TW)

(73) Assignee: Delta Electronics, Inc., Taoyuan Shien (TW)

( * ) Notice: Subject to any disclaimer, the term of this patent is extended or adjusted under 35 U.S.C. 154(b) by 235 days.

(21) Appl. No.: 12/647,905

(22) Filed: Dec. 28, 2009

(65) Prior Publication Data
US 2011/0156632 A1    Jun. 30, 2011

(51) Int. Cl.
*H02P 27/04* (2006.01)
(52) U.S. Cl. ........ 318/808; 318/807; 318/767; 318/727; 318/810; 318/811
(58) Field of Classification Search .................. 318/808, 318/807, 767, 727, 810, 811
See application file for complete search history.

(56) References Cited

U.S. PATENT DOCUMENTS 5,253,155 A * 10/1993 Yamamoto ...................... 363/71
6,459,230 B1 * 10/2002 Tao ................................ 318/798

* cited by examiner

*Primary Examiner* — Walter Benson
*Assistant Examiner* — David Luo
(74) *Attorney, Agent, or Firm* — Muncy, Geissler, Olds & Lowe, PLLC (57) ABSTRACT

A dead-time compensation method is applied to a PWM inverter, which is provided to drive an induction motor using a constant V/f control. The method first calculates a root-mean-square current of the output instantaneous current of the inverter. Afterward, a lookup table of the root-mean-square current is used to obtain a dead-time compensation base voltage and a dead-time compensation per-unit voltage. Finally, the dead-time compensation base voltage is multiplied by the dead-time compensation per-unit voltage to produce a dead-time compensation voltage of the PWM inverter. Accordingly, the method reduces complexity of converting the current to the voltage to reach a faster real-time response. Furthermore, a more accurate dead-time compensation voltage is obtained without increasing hardware costs and the efficiency of operating the induction motor is improved at low speed and light load condition.

18 Claims, 6 Drawing Sheets

DEAD-TIME COMPENSATION APPARATUS OF PWM INVERTER AND METHOD THEREOF

BACKGROUND OF THE INVENTION

1. Field of the Invention

The present invention relates to a dead-time compensation apparatus of a PWM inverter and method thereof, and more particularly to a dead-time compensation apparatus of a PWM inverter and method thereof that produces a dead-time compensation voltage by using a lookup table.

2. Description of Prior Art

The commonly used technologies of controlling the inverter can be divided into two parts: scalar control and vector control. Although the scalar control is inferior at dynamic response, speed control ratio, and control accuracy in comparison with the vector control, the scalar control is simple in structure, easy to implement, and stable to control. Hence, the scalar control is widely used in a non-servo control system. The scalar control is also called a constant V/f control, or a variable voltage variable frequency control (VVVF control) method. Generally speaking, the constant V/f control is an open-loop control, namely, a rotational speed of the induction motor is easily changed by using an inverter without feeding back the rotational speed. However, torque of the induction motor will reduce because output frequency of the inverter increases while input voltage of the inverter is not simultaneously changed. Hence, in order to keep magnetic flux of the induction motor constant to generate maximum efficiency, the ratio of voltage magnitude to operation frequency has to be constant.

When the induction motor is operated at low speed and light load condition, output voltage error of the inverter is significant due to the voltage drop of the switching elements. Hence, performance of the motor control for low speed and light load operation is lower even through the constant V/f control is easy to implement.

In addition, due to non-linearity in a solid-state switching element, such as turn-on delay and turn-off delay, the solid-state switching element does not immediately turn-on or turn-off when being driven by an input trigger command. In order to avoid both top and bottom side switching elements turning on or turning off simultaneously, a short delay time or so-called dead-time has to be added.

A strategy of the dead-time compensation is to add a time delay when the switching element is switched from a turn-off state to a turn-on state. Also, the time delay is determined according to switching speed of the switching element. However, the fundamental components of the output voltage of the inverter reduce and the low-frequency harmonic components increase when the dead-time is added. Hence, the low-frequency harmonic components could significantly influence the motor to cause current distortion in the zero-crossing current region when the motor is operated at an open-loop low-speed condition.

Figure 1A:
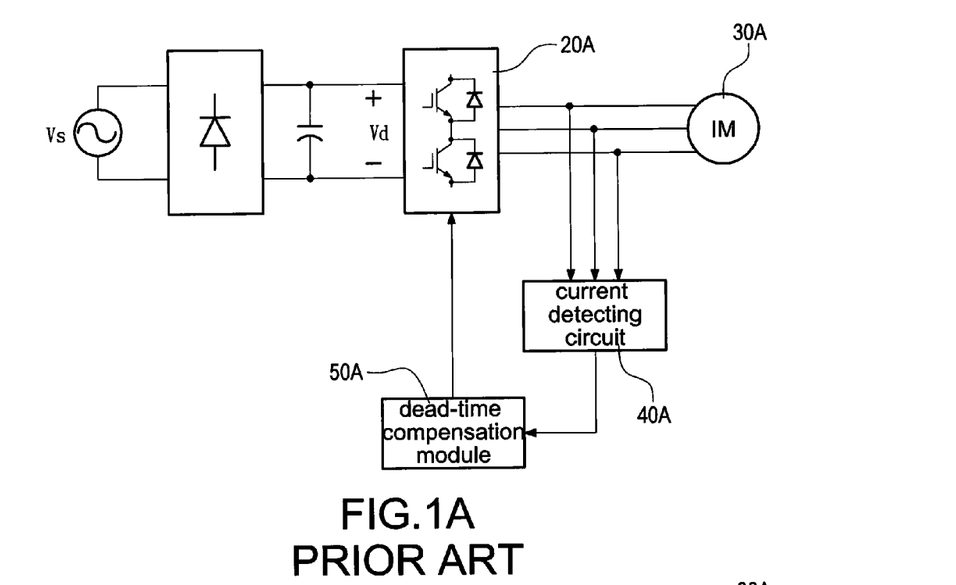
FIG. 1A is a block diagram of a prior art dead-time circuit of an inverter.

Reference is made to FIG. 1A which is a block diagram of a prior art dead-time circuit of an inverter. This is one of the most commonly used dead-time compensation approaches. A dead-time compensation voltage is produced by calculating a three-phase output current detected from a motor 30A. Namely, a current detecting circuit 40A is used to detect the three-phase output current of the inverter 20A. The three-phase output current is received by a dead-time compensation module 50A. According to the polarity of the three-phase current, a PWM voltage command adds or subtracts an offset voltage to produce a trapezoid compensation curve in phase with the output current. However, the ideal compensation voltage is not easily obtained due to the non-smoothing trapezoid compensation curve. More particularly, the distortion of output current could cause a discontinuous motion of the induction motor when the induction motor is operated at low speed and light load condition.

Another of the most commonly used approaches (voltage feedback) is described as follows and the demonstrated approach also improves the above-mentioned the current distortion when the motor is operated at an open-loop low-speed condition.

Figure 1B:
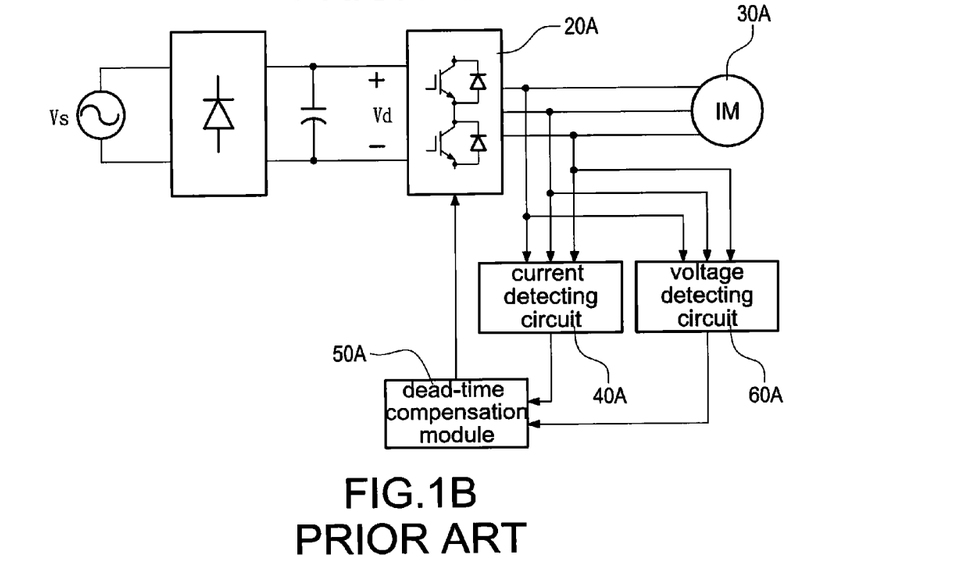
FIG. 1B is an circuit diagram of a prior art dead-time circuit of an inverter.

Reference is made to FIG. 1B which is a block diagram of a prior art dead-time circuit of an inverter. The difference between the approach and the above-mentioned approach is that a voltage detecting circuit 60A is further added. The voltage detecting circuit 60A is used to detect an offset voltage of the three-phase output voltage of the inverter 20A. Hence, a dead-time compensation voltage can be calculated according to an offset voltage and the polarity of the three-phase current. Also, the curve of the output current is similarly to a smoothing sinusoidal waveform to provide more accurate dead-time compensation voltage to improve current distortion when the motor is operated at low speed and light load condition. However, a main disadvantage of this approach is that the voltage detecting circuit 60A increases hardware costs.

Accordingly, a dead-time compensation apparatus of a PWM inverter and a method thereof are provided to obtain a more accurate dead-time compensation voltage without increasing hardware costs and improve the efficiency of operating the induction motor at low speed and light load condition.

SUMMARY OF THE INVENTION

In order to solve the above-mention problems, a dead-time compensation apparatus of a PWM inverter is disclosed. The inverter has a plurality of switching elements, and turn-on and turn-off states of the switching elements are controlled by a gate driver circuit to drive an induction motor using a constant V/f control. Furthermore, a three-phase output current of the inverter is detected by a current detecting circuit to be as an analog detecting current. The dead-time compensation apparatus of a PWM inverter includes an analog-to-digital conversion unit, a voltage/frequency control unit, a dead-time compensation logical unit, and a PWM generating unit.

The analog-to-digital conversion unit is connected to the current detecting circuit to receive the analog detecting current and convert the analog detecting current into a digital detecting current. In a closed-loop speed control, the analog-to-digital conversion unit receives an output frequency of the induction motor and converts the output frequency into a digital detecting frequency. The voltage/frequency control unit is connected to the analog-to-digital conversion unit to receive the digital detecting frequency. In the closed-loop speed control, the voltage/frequency control unit further receives an external frequency command. The voltage/frequency control unit obtains a frequency difference between the digital detecting frequency and the frequency command and outputs a corresponding reference voltage according to a relationship between voltage and frequency of the voltage/frequency control unit. The dead-time compensation logical unit is connected to the analog-to-digital conversion unit and the voltage/frequency control unit to receive the digital detecting current and the reference voltage and outputs a voltage command. The PWM generating unit is connected to the dead-time compensation logical unit to receive and convert the voltage command and outputs a PWM voltage command to the gate driver circuit.

The dead-time compensation logical unit includes a root-mean-square calculation unit, a divider, a first current-to-voltage conversion unit, a second current-to-voltage conversion unit, a multiplier, and an adder. The root-mean-square calculation unit receives the digital detecting current to calculate a root-mean-square value of the digital detecting current to be as a base current. The divider is connected to the root-mean-square calculation unit to calculate a ratio between the digital detecting current and the base current to be as a per-unit current. The first current-to-voltage conversion unit is connected to the root-mean-square calculation unit to receive the base current and outputs a corresponding base compensation voltage according to a relationship between current and voltage of the first current-to-voltage conversion unit. The second current-to-voltage conversion unit is connected to the divider to receive the per-unit current and outputs a corresponding per-unit compensation voltage according to a relationship between current and voltage of the second current-to-voltage conversion unit. The multiplier is connected to the first current-to-voltage conversion unit and the second current-to-voltage conversion unit to multiply the base compensation voltage and the per-unit compensation voltage to obtain a compensation voltage. The adder is connected to the multiplier to add the compensation voltage and the reference voltage, which is outputted from the voltage/frequency control unit, to be as the voltage command.

In order to solve the above-mention problems, a method of providing a dead-time compensation for a PWM inverter is disclosed. The inverter is provided to drive an induction motor using a constant V/f control. First, a three-phase instantaneous current outputted from the inverter is calculated to be as a three-phase root-mean-square current. Afterward, a dead-time compensation base voltage is obtained by a lookup table corresponding to a first conversion relationship between current and voltage. Afterward, a three-phase per-unit current is obtained by calculating a ratio between the three-phase instantaneous current and the three-phase root-mean-square current. Afterward, a dead-time compensation per-unit voltage is obtained by a lookup table corresponding to a second conversion relationship between current and voltage. Finally, a dead-time compensation voltage is obtained by multiplying the dead-time compensation base voltage and the dead-time compensation per-unit voltage.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Reference will now be made to the drawing figures to describe the present invention in detail.

Figure 2A:
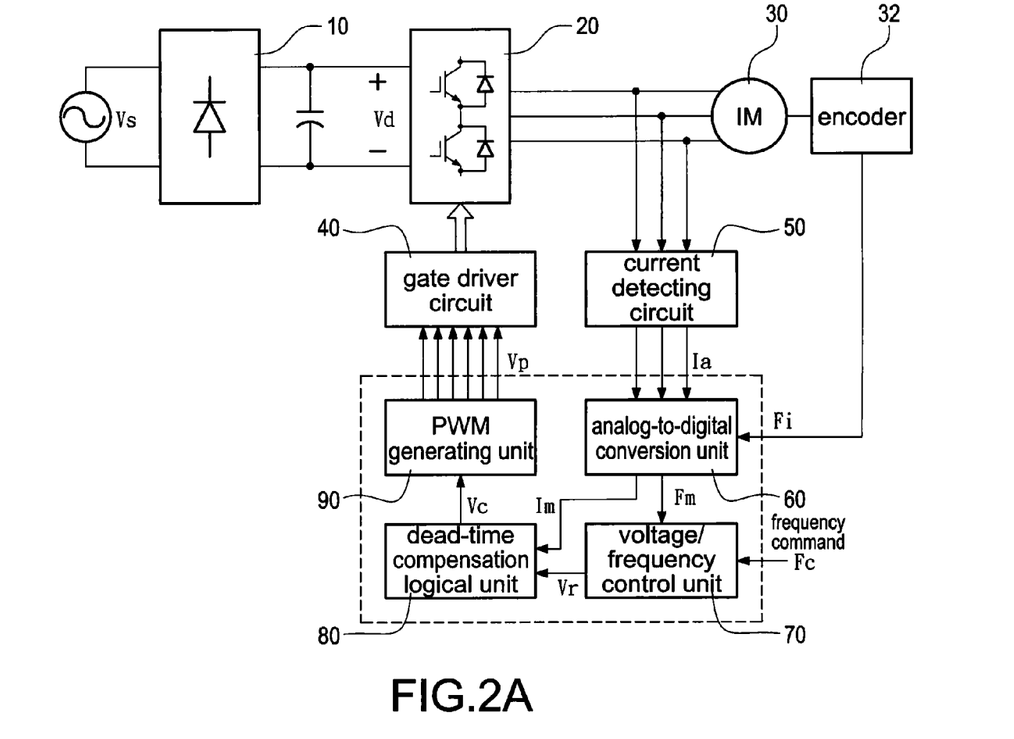
FIG. 2A is a block diagram of a motor drive system operating in a closed-loop speed control.

Reference is made to FIG. 2A which is a block diagram of a motor drive system operating in a closed-loop speed control. A rectifier 10 which is composed of a plurality of diodes (not labeled) is electrically connected to a three-phase AC source Vs. The AC voltage Vs is converted to a DC voltage. Afterward, a capacitor (not labeled) is added behind the rectifier 10 to reduce voltage ripple of the DC voltage to produce a smoothed DC voltage Vd. Finally, an inverter 20 converts the DC voltage Vd into a pulsating voltage to control an induction motor 30. Namely, the inverter 20 can invert the fixed-voltage and fixed-frequency AC source Vs into the variable-frequency and variable-voltage AC source to drive the induction motor 30.

Although the three-phase current and voltage are disclosed for demonstration in the present invention, a transformation is known as the abc-dq coordinates transformation can be used to implement the same function. Hence, the detail description of the coordinate's transformation is omitted here for conciseness.

The present invention further discloses a dead-time compensation apparatus of a PWM inverter. The inverter 20 has a plurality of switching elements, and turn-on and turn-off states of the switching elements are controlled by a gate driver circuit 40 to drive an induction motor using a constant V/f control. A current detecting circuit 50 detects a three-phase output current outputted from the inverter to be as an analog detecting current. More particularly, the switching elements of the inverter 20 can be IGBTs or MOSFETs with high-current, high-voltage, and fast switching features. In addition, an encoder 32 is installed on a shaft of the motor 30 to measure speed of the motor 30, and the measured speed is fed back and compared in a closed-loop control. Because the speed of the motor 30 is proportional to an output frequency Fi thereof, the output frequency Fi of the motor can be calculated according to the measured speed thereof.

The dead-time compensation apparatus of a PWM inverter includes an analog-to-digital conversion unit 60, a voltage/frequency control unit 70, a dead-time compensation logical unit 80, and a PWM generating unit 90.

The analog-to-digital conversion unit 60 is connected to the current detecting circuit 50 to receive the analog detecting current Ia and convert the analog detecting current Ia into a digital detecting current Im. Furthermore, the analog-to-digital conversion unit 60 receives an output frequency Fi of the induction motor 30 and converts the output frequency Fi into a digital detecting frequency Fm. In a closed-loop speed control, the voltage/frequency control unit 70 is connected to the analog-to-digital conversion unit 60 to receive the digital detecting frequency Fm and further receive an external frequency command Fc. Hence, the voltage/frequency control unit 70 obtains a frequency difference between the digital detecting frequency Fm and the frequency command Fc and outputs a corresponding reference voltage Vr according to a relationship between voltage and frequency of the voltage/frequency control unit 70. The dead-time compensation logical unit 80 is connected to the analog-to-digital conversion unit 60 and the voltage/frequency control unit 70 to receive the digital detecting current Im and the reference voltage Vr and outputs a voltage command Vc. The PWM generating unit 90 is connected to the dead-time compensation logical unit 80 to receive and convert the voltage command Vc and outputs a PWM voltage command Vp to the gate driver circuit 40. The detailed description of the dead-time compensation logical unit 80 will be made hereinafter with reference to FIG. 3.

Figure 2B:
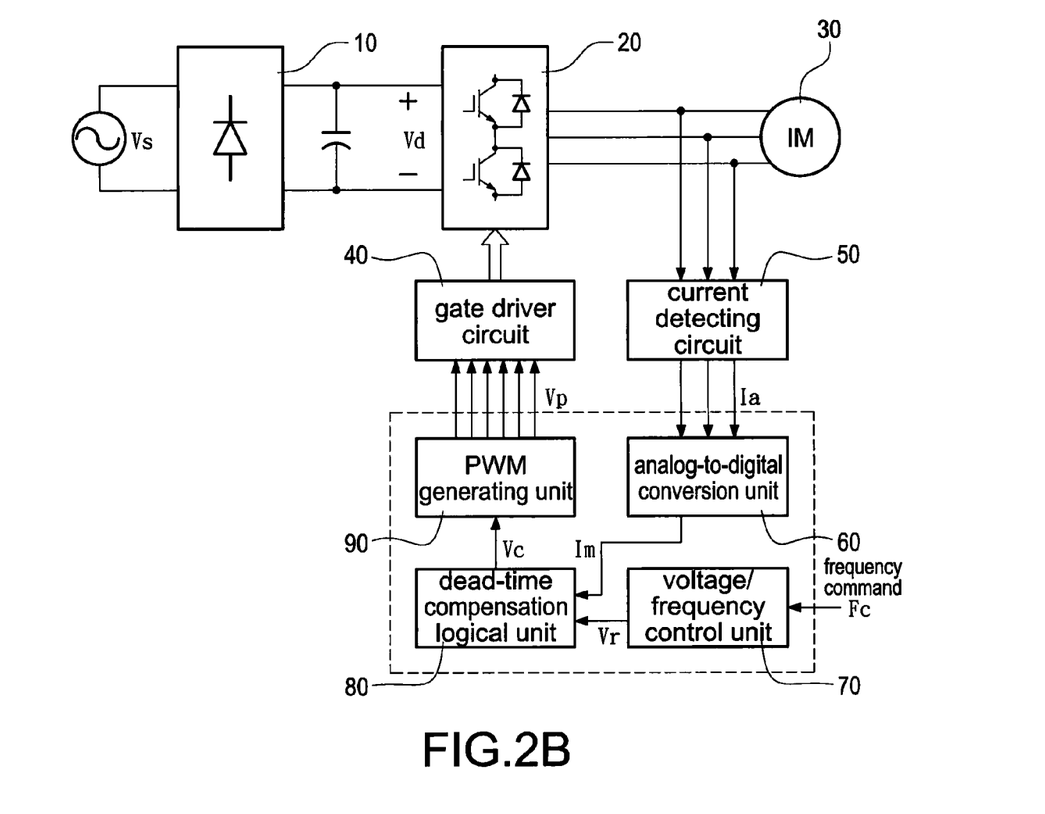
FIG. 2B is a block diagram of the motor drive system operating in an open-loop speed control.

Reference is made to FIG. 2B which is a block diagram of operating the motor drive system in an open-loop speed control. The structure of the open-loop speed control is similar to the structure of the above-mentioned closed-loop speed control. However, the difference between the two speed controls is that the encoder 32 is not required in the open-loop speed control. Accordingly, the voltage/frequency control unit 70 directly receives the external frequency command Fc and outputs a corresponding reference voltage Vr according to the relationship between voltage and frequency of the voltage/frequency control unit 70. Hence, the detail description of the signal processing is omitted here for conciseness.

Figure 3:
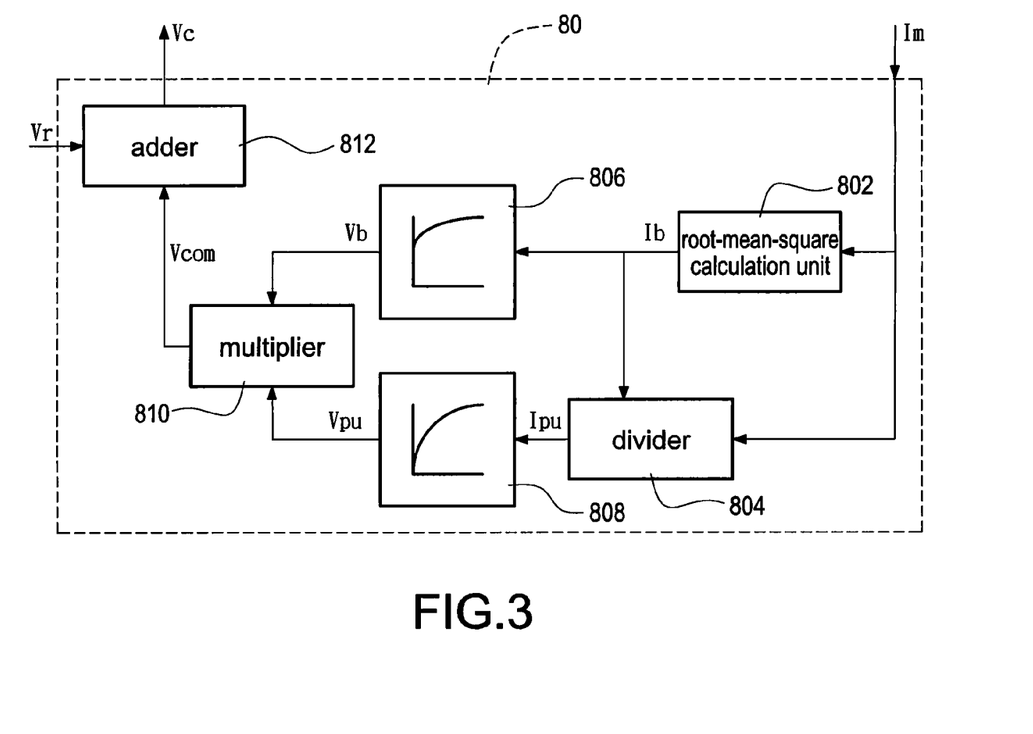
FIG. 3 is block diagram of a dead-time compensation logical unit of a dead-time compensation apparatus according to the present invention.

Reference is made to FIG. 3 which is block diagram of a dead-time compensation logical unit of a dead-time compensation apparatus according to the present invention. The dead-time compensation logical unit 80 includes a root-mean-square calculation unit 802, a divider 804, a first current-to-voltage conversion unit 806, a second current-to-voltage conversion unit 808, a multiplier 810, and an adder 812. The root-mean-square calculation unit 802 receives the digital detecting current Im to calculate a root-mean-square value of the digital detecting current Im to be as a base current Ib. The divider 804 is connected to the root-mean-square calculation unit 802 to calculate a ratio between the digital detecting current Im and the base current Ib to be as a per-unit current Ipu. The first current-to-voltage conversion unit 806 is connected to the root-mean-square calculation unit 802 to receive the base current Ib and outputs a corresponding base compensation voltage Vb according to a relationship between current and voltage of the first current-to-voltage conversion unit 806. The second current-to-voltage conversion unit 808 is connected to the divider 804 to receive the per-unit current Ipu and outputs a corresponding per-unit compensation voltage Vpu according to a relationship between current and voltage of the second current-to-voltage conversion unit 808. The multiplier 810 is connected to the first current-to-voltage conversion unit 806 and the second current-to-voltage conversion unit 808 to multiply the base compensation voltage Vb with the per-unit compensation voltage Vpu to obtain a compensation voltage Vcom. The adder 812 is connected to the multiplier 810 to add the compensation voltage Vcom and the reference voltage Vr, which is outputted from the voltage/frequency control unit 70, to be as the voltage command Vc. More particularly, the dead-time compensation logical unit 80 further includes a current polarity unit (not shown). The current polarity unit detects the polarity of the three-phase output current of the inverter 20 to determine the polarity of the compensation voltage Vcom.

Figure 4A:
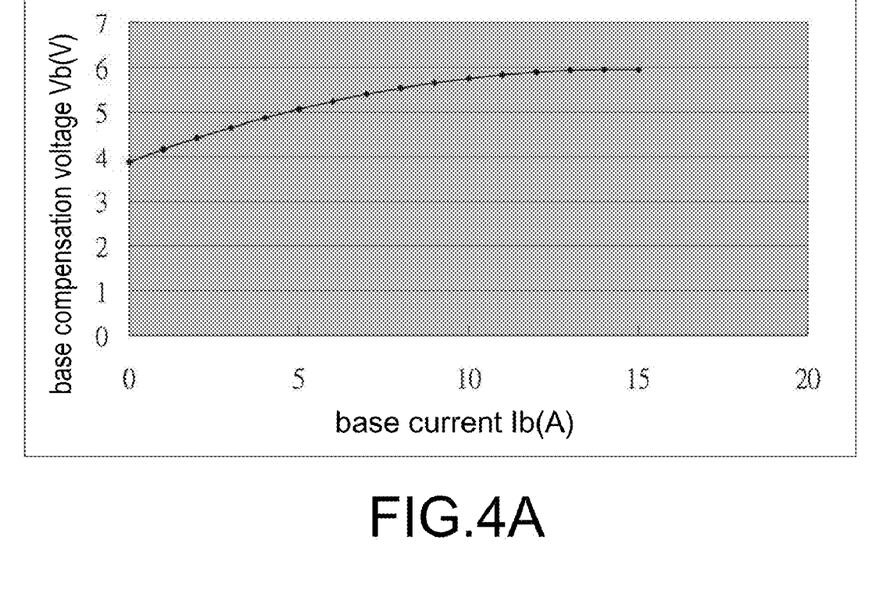
FIG. 4A is a curve chart showing a relationship between current and voltage of a first current-to-voltage conversion unit.
Figure 4B:
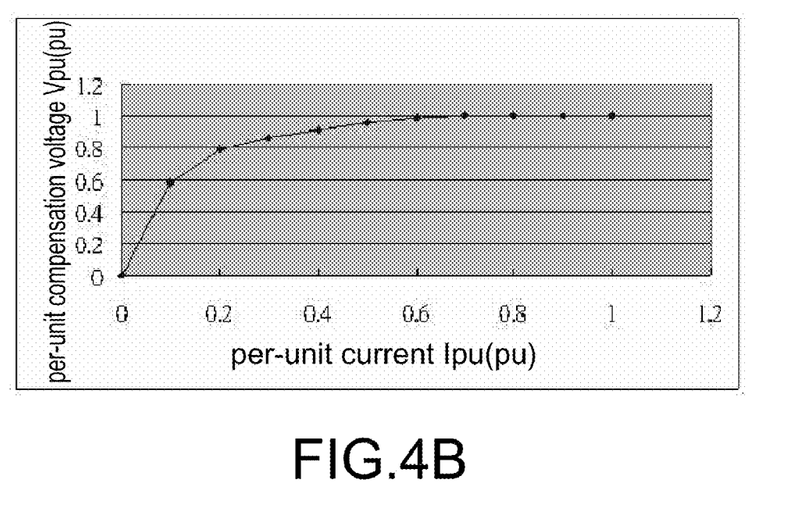
FIG. 4B is a curve chart showing a relationship between current and voltage of a second current-to-voltage conversion unit.

Reference is made to FIG. 4A and FIG. 4B which are curve charts showing a relationship between current and voltage of a first current-to-voltage conversion unit and a relationship between current and voltage of a second current-to-voltage conversion unit, respectively. More particularly, the two curves are both monotonic increasing curves. As shown in FIG. 4A, the abscissa represents the base current Ib (in amperes) and the ordinate represents the base compensation voltage Vb (in volts). The relationship between current and voltage of the first current-to-voltage conversion unit 806, namely the relationship between the base current Ib and the base compensation voltage Vb, is determined according to the turn-on time and the turn-off time of the switching elements of the inverter 20. Furthermore, the relationship between the base current Ib and the base compensation voltage Vb of the first current-to-voltage conversion unit 806 can be also determined by injecting a current and outputting a voltage difference between an actual voltage and a theoretic voltage. More particularly, an interpolation method or other numerical analysis methods can be used to provide the best fit to a series of discrete data points to approximately construct the relationship between the base current Ib and the base compensation voltage Vb of the first current-to-voltage conversion unit 806.

In this embodiment, an example is demonstrated as shown in FIG. 4A. By a lookup table corresponding to the relationship between current and voltage of the first current-to-voltage conversion unit 806, the corresponding base compensation voltage Vb is 5.06 volts when the calculated base current Ib is 5 amperes by the root-mean-square calculation unit 802. In addition, the corresponding base compensation voltage Vb is 5.75 volts when the calculated base current Ib is 10 amperes. However, when the calculated base current Ib is 7.3 amperes, because there is not any base compensation voltage Vb be exactly corresponded, the base compensation voltage Vb can be calculated as about 5.75 volts by using the interpolation method or other numerical analysis methods.

As shown in FIG. 4B, the abscissa represents the per-unit current Ipu (in per unit) and the ordinate represents the per-unit compensation voltage Vpu (in per unit). The relationship between current and voltage of the second current-to-voltage conversion unit 808, namely the relationship between the per-unit current Ipu and the per-unit compensation voltage Vpu, is determined according to the turn-on time and the turn-off time of the switching elements of the inverter 20. Furthermore, the relationship between the per-unit current Ipu and the per-unit compensation voltage Vpu of the second current-to-voltage conversion unit 808 can be also determined by injecting a current and outputting a voltage difference between an actual voltage and a theoretic voltage. More particularly, an interpolation method or other numerical analysis methods can be used to provide the best fit to a series of discrete data points to approximately construct the relationship between the per-unit current Ipu and the per-unit compensation voltage Vpu of the second current-to-voltage conversion unit 808.

In this embodiment, an example is demonstrated as shown in FIG. 4B. By a lookup table corresponding to the relationship between current and voltage of the second current-to-voltage conversion unit 808, the corresponding per-unit compensation voltage Vpu is 0.8 per unit when the calculated per-unit current Ipu is 0.2 per unit by the divider 804. In addition, the corresponding per-unit compensation voltage Vpu is 0.93 per unit when the calculated per-unit current Ipu is 0.4 per unit. However, when the calculated per-unit current Ipu is 0.35 per unit, because there is not any per-unit compensation voltage Vpu being exactly corresponded, the per-unit compensation voltage Vpu can be calculated as about 0.89 per unit by using the interpolation method or other numerical analysis methods.

Figure 5:
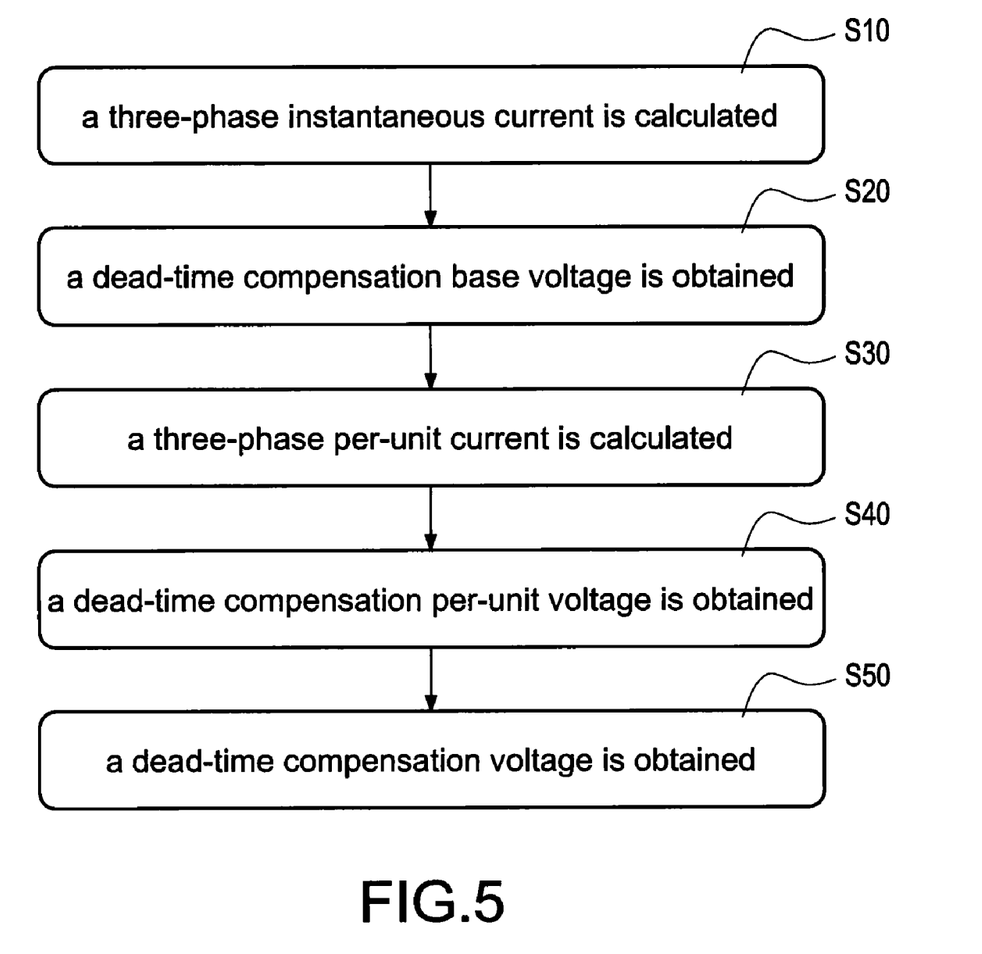
FIG. 5 is a flow chart of a method of providing a dead-time compensation for a PWM inverter.

Reference is made to FIG. 5 which is a flow chart of a method of providing a dead-time compensation for a PWM inverter. The inverter is used to drive an induction motor using a constant V/f control. The steps of the method as follows:

First, a first conversion relationship between current and voltage and a second conversion relationship between current and voltage are built according to the turn-on time and the turn-off of switching elements of the inverter. In addition, the first conversion relationship between current and voltage and the second conversion relationship between current and voltage can be also built by injecting a current and outputting a voltage difference between an actual voltage and a theoretic voltage. Afterward, a three-phase instantaneous current outputted from the inverter is calculated to be as a three-phase root-mean-square current (S10). Afterward, a dead-time compensation base voltage is obtained by a lookup table corresponding to the first conversion relationship between current and voltage (S20). Afterward, a ratio between the three-phase instantaneous current and the three-phase root-mean-square current is calculated to be as a three-phase per-unit current (S30). Afterward, a dead-time compensation per-unit voltage is obtained by a lookup table corresponding to the second conversion relationship between current and voltage (S40). Afterward, the dead-time compensation base voltage is multiplied by the dead-time compensation per-unit voltage to produce a dead-time compensation voltage (S50). Finally, the dead-time compensation voltage is added to a reference voltage according to the constant V/f control to produce a PWM voltage command. Also, the PWM voltage command is provided to control turn-on and turn-off states of the switching elements of the inverter by a gate driver circuit to drive the induction motor.

More particularly, in the step (S20) to the step (S40), because the first conversion relationship between current and voltage and the second conversion relationship between current and voltage are discontinuous curves, part of the current data does not exactly correspond to the voltage data (shown in FIG. 4A and FIG. 4B). Accordingly, the interpolation method or other numerical analysis methods are used to provide the best fit to a series of discrete data points to approximately construct the first conversion relationship between current and voltage and the second conversion relationship between current and voltage.

Furthermore, the above-mentioned steps are processed through a digital signal processor (DSP).

In conclusion, the present invention has following advantages:

1. Building the relationships between the current and the voltage and using lookup tables calculates the dead-time compensation voltage significantly reduce computational complexity and reach a faster real-time response of calculating the dead-time compensation voltage.

2. Lookup tables are used instead of the voltage-feedback dead-time compensation provides more accurate dead-time compensation voltage and increases the efficiency of operating the induction motor at low speed and light load condition.

3. Lookup tables are used for providing the motor drive system operated both in the closed-loop speed control and in the open-loop speed control. Also, a more accurate dead-time compensation voltage is obtained without increasing hardware costs as the three-phase output current is fed back.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A dead-time compensation apparatus of a PWM inverter, the inverter having a plurality of switching elements, and turn-on and turn-off states of the switching elements controlled by a gate driver circuit to drive an induction motor using a constant V/f control, and a three-phase output current of the inverter detected to be as an analog detecting current by a current detecting circuit; the dead-time compensation apparatus of a PWM inverter comprising:

an analog-to-digital conversion unit connected to the current detecting circuit to receive the analog detecting current and convert the analog detecting current into a digital detecting current; in a closed-loop speed control, an output frequency of the induction motor is received and converted into a digital detecting frequency by the analog-to-digital conversion unit;

a voltage/frequency control unit connected to the analog-to-digital conversion unit to receive the digital detecting frequency; in the closed-loop speed control, the voltage/frequency control unit further receiving an external frequency command, and obtaining a frequency difference between the digital detecting frequency and the frequency command and outputting a corresponding reference voltage according to a relationship between voltage and frequency of the voltage/frequency control unit;

a dead-time compensation logical unit connected to the analog-to-digital conversion unit and the voltage/frequency control unit to receive the digital detecting current and the reference voltage and outputting a voltage command; the dead-time compensation logical unit comprising:

a root-mean-square calculation unit receiving the digital detecting current to calculate a root-mean-square value of the digital detecting current to be as a base current;

a divider connected to the root-mean-square calculation unit to calculate a ratio between the digital detecting current and the base current to be as a per-unit current;

a first current-to-voltage conversion unit connected to the root-mean-square calculation unit to receive the baser current and outputting a corresponding base compensation voltage according to a relationship between current and voltage of the first current-to-voltage conversion unit;

a second current-to-voltage conversion unit connected to the divider to receive the per-unit current and outputting a corresponding per-unit compensation voltage according to a relationship between current and voltage of the second current-to-voltage conversion unit;

a multiplier connected to the first current-to-voltage conversion unit and the second current-to-voltage conversion unit to calculate a compensation voltage by multiplying the base compensation voltage and the per-unit compensation voltage; and an adder connected to the multiplier to add the compensation voltage and the reference voltage to produce the voltage command; and a PWM generating unit connected to the dead-time compensation logical unit to receive and convert the voltage command and outputting a PWM voltage command to the gate driver circuit.

2. The dead-time compensation apparatus of the PWM inverter in claim 1, wherein the voltage/frequency control unit directly receives the external frequency command to produce the voltage command according to the relationship between voltage and frequency of the voltage/frequency control unit in an open-loop speed control.

3. The dead-time compensation apparatus of the PWM inverter in claim 1, wherein the relationship between current and voltage of the first current-to-voltage conversion unit is a monotonic increasing curve.

4. The dead-time compensation apparatus of the PWM inverter in claim 1, wherein the relationship between current and voltage of the second current-to-voltage conversion unit is a monotonic increasing curve.

5. The dead-time compensation apparatus of the PWM inverter in claim 1, wherein the relationship between the base current and the base compensation voltage of the first current-to-voltage conversion unit is determined according to the turn-on time and turn-off time of the switching elements of the inverter.

6. The dead-time compensation apparatus of the PWM inverter in claim 1, wherein the relationship between the per-unit current and the per-unit compensation voltage of the second current-to-voltage conversion unit is determined according to the turn-on time and turn-off time of the switching elements of the inverter.

7. The dead-time compensation apparatus of the PWM inverter in claim 1, wherein the relationship between the base current and the base compensation voltage of the first current-to-voltage conversion unit is determined by injecting a current and outputting a voltage difference between an actual voltage and a theoretic voltage.

8. The dead-time compensation apparatus of the PWM inverter in claim 1, wherein the relationship between the base current and the base compensation voltage of the second current-to-voltage conversion unit is determined by injecting a current and outputting a voltage difference between an actual voltage and a theoretic voltage.

9. The dead-time compensation apparatus of the PWM inverter in claim 1, wherein the relationship between current and voltage of the first current-to-voltage conversion unit and the relationship between current and voltage of the second current-to-voltage conversion unit are approximately constructed by using an to provide the best fit to a series of discrete data points.

10. The dead-time compensation apparatus of the PWM inverter in claim 1, wherein the relationship between current and voltage of the first current-to-voltage conversion unit and the relationship between current and voltage of the second current-to-voltage conversion unit are approximately constructed by using a numerical analysis method to provide the best fit to a series of discrete data points.

11. The dead-time compensation apparatus of the PWM inverter in claim 1, wherein the switching elements of the inverter are IGBTs.

12. A method of providing a dead-time compensation for a PWM inverter, the inverter driving an induction motor using a constant V/f control; the method comprising the steps:

(a) calculating a three-phase instantaneous current outputted from the inverter to be as a three-phase root-mean-square current;
(b) obtaining a dead-time compensation base voltage by a lookup table corresponding to a first conversion relationship between current and voltage;
(c) calculating a ratio between the three-phase instantaneous current and the three-phase root-mean-square current to be as a three-phase per-unit current;
(d) obtaining a dead-time compensation per-unit voltage by a lookup table corresponding to a second conversion relationship between current and voltage; and
(e) multiplying the dead-time compensation base voltage and the dead-time compensation per-unit voltage to produce a dead-time compensation voltage.

13. The method of providing a dead-time compensation for a PWM inverter in claim 12, after the step (e) further comprising:

(f) adding the dead-time compensation voltage and a reference voltage according to the constant V/f control to produce a PWM voltage command.

14. The method of providing a dead-time compensation for a PWM inverter in claim 12, wherein the step (a) to the step (f) are processed by a digital signal processor.

15. The method of providing a dead-time compensation for a PWM inverter in claim 12, before the step (a) further comprising:

building a first conversion relationship between current and voltage and a second conversion relationship between current and voltage according to the turn-on time and the turn-off of switching elements of the inverter.

16. The method of providing a dead-time compensation for a PWM inverter in claim 12, before the step (a) further comprising:

building the first conversion relationship between current and voltage and the second conversion relationship between current and voltage by injecting a current and outputting a voltage difference between an actual voltage and a theoretic voltage.

17. The method of providing a dead-time compensation for a PWM inverter in claim 12, in the step (a) to step (d), wherein the first conversion relationship between current and voltage and the second conversion relationship between current and voltage are approximately constructed by using an interpolation method to provide the best fit to a series of discrete data points.

18. The method of providing a dead-time compensation for a PWM inverter in claim 12, in the step (a) to step (d), wherein the first conversion relationship between current and voltage and the first conversion relationship between current and voltage are approximately constructed by using a numerical analysis method to provide the best fit to a series of discrete data points.

* * * * *